June 15, 1971   J. SLIWINSKI   3,584,351
LAWN MOWER HOOK FOR GRASS CATCHER
Filed April 8, 1969

INVENTOR.
BY John Sliwinski

# United States Patent Office 3,584,351
Patented June 15, 1971

3,584,351
LAWN MOWER HOOK FOR GRASS CATCHER
John Sliwinski, 4708 E. 88th St.,
Garfield Heights, Ohio 44125
Filed Apr. 8, 1969, Ser. No. 815,274
Int. Cl. A44b *13/02*
U.S. Cl. 24—239                         3 Claims

ABSTRACT OF THE DISCLOSURE

A two position hook for use with lawn mowers or the like comprising a rod spring biased across and enclosing a C-shaped slot to retain a member within said slot, and a locking pin and associated washer adapted to lock the rod against the bias of the spring to maintain the rod in an open position permitting said member to be moved into and out of said slot.

BACKGROUND OF THE INVENTION

This invention relates, as indicated, to a hook for lawn mowers or the like, and, more specifically, to a hook for attaching a grass catcher or basket to a conventional push mower.

One standard hook used with lawn mowers has a retaining portion with the entrance thereof in a continually open position with no means of closing the same. Therefore, the attached grass catcher may slip off the hook dumping the collected grass clippings. In addition, it is possible that the grass catcher in slipping off the hook may be impelled into the reel, thereby causing damage to both the reel and grass catcher as well as dumping the collected grass clippings.

SUMMARY OF THE INVENTION

Accordingly, it is the primary object of the present invention to provide a hook which may be biased into a closed and secured position, but which may also be locked into an open position. With the accomplishment of the foregoing object, a grass catcher attached to a lawn mower by using the hook of the present invention will be secured during use but may be readily removed upon placing the hook in its open position.

Another object of the present invention is to provide a novel locking means for the rod of the hook comprising a locking pin depending from a knob attached to the rod, said pin bearing against a washer surface of the hook body in the locked open position of the hook and extending through a peripheral recess of the washer in the closed position of the hook.

Still another object of the present invention is to provide a spring bias for the rod urging the same into engagement with the hook socket for normally enclosing the C-shaped retaining portion of the hook. The spring bias will also urge the locking pin into engagement with the shoulder of the washer in the open position of the hook, since the axis of the locking pin is parallel to the axis of the rod.

And still another object of the present invention is to provide a dirt vent for the removal of such impediments which have become lodged in the socket or are carried by the end of the rod. By removal of the dirt from the socket, a tight fit between the rod and the socket is insured, and the rod will always be able to be moved into its closed position.

These and other objects of the present invention will become apparent as the following description proceeds.

To the accomplishment of the foregoing and related ends, the invention comprises the features hereinafter fully described and particularly pointed out in the claims, the following description and the annexed drawings setting forth in certain detail illustrative embodiments of the invention, these being indicative of but a few of the various ways in which the principle of the invention may be employed.

DESCRIPTION OF THE PREFERRED EMBODIMENTS

Figure 1:
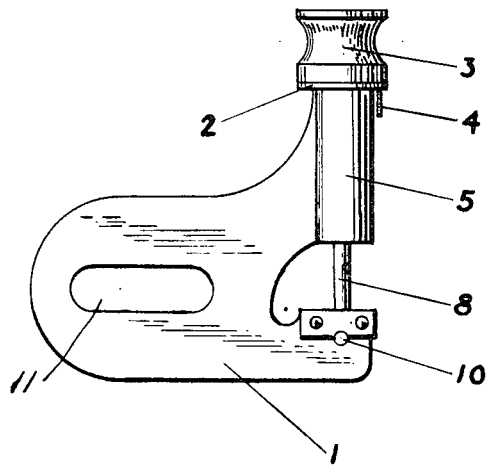
FIG. 1 is an elevation of the present invention showing the hook in its closed position.
Figure 2:
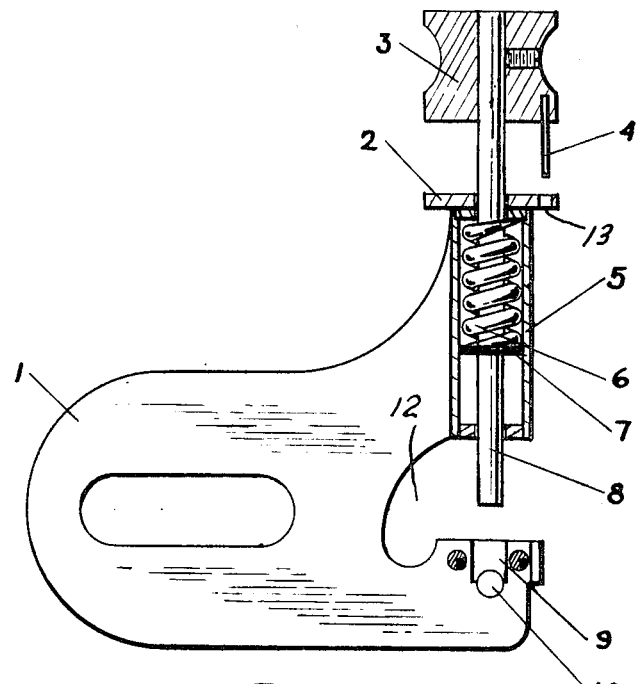
FIG. 2 is a view similar to FIG. 1, with the enclosing means of the hook in cross section, showing, however, the hook in its open position.

Referring now in more detail to the drawings, wherein like parts are indicated by like reference numerals, the body 1 of the hook is provided with an elongated slot 11 which is used for joining the hook with one of two members to be coupled. For example, the hook may be joined to the lawn mower by fastening means associated with a rearwardly depending skirt of the mower and the elongated slot 11 of the hook.

Along one side of the body 1, the hook is provided with a centrally bored cylinder 5 aligned with but spaced above the socket 9. Between the cylinder 5 and the socket 9, there is a C-shaped slot or retaining portion which receives the connective means of the second member to be coupled. Again by way of example, a wire associated with the leading edge of a basket or grass catcher may be inserted into the C-shaped retaining portion to be carried thereby.

A space washer 2 is connected to the top of the cylinder to close off the bore thereof except for a central opening therein. The space washer is of greater diameter than the cylinder, thereby defining a shoulder which extends beyond the outer wall of the cylinder. This shoulder extension is provided with a peripheral recess 13.

A rod 8 extends through both the central opening in the washer 2 and the cylinder 5, and is of sufficient length to be operatively engaged with the socket 9 in the closed position of the hook shown in FIG. 1. The rod 8 is biased into engagement with the socket 9 by a spring 6, which is disposed within the cylinder 5 and interposed between piston 7 and the bottom surface of the washer 2.

The piston 7 is secured to the rod 8 and has a diameter substantially equal to the inside diameter of the cylinder for sliding engagement therewith. The piston 7 and the central recess in the washer 2 guide the rod 8 in repetitive straight line motion to insure proper seating of the rod in the socket. An additional cover plate with guiding central recess could be attached to the bottom of the cylinder 5.

The rod 8 has a knob 3 secured thereto, which knob has a downwardly depending locking pin 4. The locking pin 4 is received in the peripheral recess or opening 13 in the washer 2 in the closed position of the hook, as shown in FIG. 1, and bears against the extended shoulder of the washer 2 in the open position of the hook when the knob 3 is turned a slight amount, for example, a ¼ turn.

A dirt vent 10 extends through the hook body 1 into the bottom of the socket 9 and serves to keep the socket free of dirt or other impediments which might become lodged therein or which might be carried by the rod 8. The movement of the rod into the socket is the impelling force for the movement of the dirt through the vent, thereby insuring continually efficient seating of the rod in the socket.

In operation, the hook is attached by fastening means associated with the elongated slot 11 to the first member to be coupled. The hook is then moved to its open position by pulling upwardly on knob 3 against the bias of the spring 6 until the locking pin 4 clears the peripheral recess 13. The knob 3 and attached shaft 8 are then rotated approximately a ¼ turn until the locking pin 4 under the bias of the spring 6 bears against the extended shoulder of the washer. The height of the pin 4 enables the rod 8 to be held above the socket 9, thereby maintaining the hook in its open position.

In such position, the connection means of the second member to be coupled is inserted into the C-shaped slot 12. After such insertion, the knob 3 is again rotated until the pin 4 mates with and is received, under the spring bias, in the peripheral recess 13. The spring 6 biases the rod 8 into operative engagement with the socket 9, thereby closing the slotted portion 12 of the hook.

Other modes of applying the principles of the invention may be employed, change being made as regards the details described provided the features stated in any of the following claims or the equivalent of such be employed.

I claim:

1. A two position hook comprising a body containing a bored cylinder, a socket aligned with but spaced below said cylinder, said body between said cylinder and said socket having a C-shaped slot, a space washer secured to the top of said cylinder and having a central opening therein, said washer having a diameter greater than said cylinder to form an outwardly extending shoulder which has a peripheral recess therein, a rod extending through said cylinder and said central opening which is of sufficient length to engage at one end thereof said socket, biasing means for urging said rod toward said socket, and a knob attached to the other end of said rod, said knob having a downwardly depending lock pin, whereby, in a first closed position of the hook, said rod is urged by said biasing means into socket engagement thereby closing said C-shaped slot with said locking pin received in said peripheral recess, and, in a second open position of the hook, said rod is retained in spaced relation from said socket by said locking pin bearing against said washer shoulder, thereby opening said C-shaped slot.

2. A two position hook as in claim 1 wherein said biasing means comprises a piston attached to said rod within the bore of said cylinder, said piston being of a diameter substantially equal to said bore for sliding engagement therewith, and a compression spring disposed within said cylinder and interposed between said space washer and piston to bias the rod toward said socket.

3. A two position hook as in claim 2 wherein a dirt vent extends through said body into the bottom of said socket, whereby dirt within said socket will be forced therefrom and along said vent by said rod engaging said socket.

References Cited

UNITED STATES PATENTS

| | | | |
|---|---|---|---|
| 670,384 | 3/1901 | Clayton | 24—239 |
| 710,497 | 10/1902 | Myers | 24—239 |
| 730,075 | 6/1903 | Allison | 24—239 |
| 1,475,046 | 11/1923 | Bolei | 24—241SL |

DONALD A. GRIFFIN, Primary Examiner